United States Patent
Kwon et al.

(10) Patent No.: US 7,181,098 B2
(45) Date of Patent: Feb. 20, 2007

(54) OPTICAL HYBRID MODULE AND MANUFACTURING METHOD THEREOF

(75) Inventors: Oh-Dal Kwon, Suwon-shi (KR); Joo-Hoon Lee, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 206 days.

(21) Appl. No.: 10/684,885

(22) Filed: Oct. 14, 2003

(65) Prior Publication Data

US 2004/0247230 A1    Dec. 9, 2004

(30) Foreign Application Priority Data

Jun. 9, 2003    (KR)    .................... 10-2003-0036716

(51) Int. Cl.
*G02B 6/12*    (2006.01)

(52) U.S. Cl. ........................................ 385/14; 385/129

(58) Field of Classification Search .................. 385/14, 385/88–94, 129–132, 147
See application file for complete search history.

(56) References Cited

U.S. PATENT DOCUMENTS

| | | | |
|---|---|---|---|
| 6,027,255 A * | 2/2000 | Joo et al. ...................... 385/88 |
| 6,438,280 B1 * | 8/2002 | Gampp et al. ................. 385/14 |
| 6,445,857 B1 * | 9/2002 | Korenaga et al. .............. 385/52 |
| 6,480,639 B2 * | 11/2002 | Hashimoto et al. ........... 385/14 |
| 6,904,209 B2 * | 6/2005 | Okada et al. .................. 385/49 |

FOREIGN PATENT DOCUMENTS

| JP | 02-208982 | 8/1990 |
|---|---|---|
| JP | 06-053469 | 2/1994 |
| JP | 10-233183 | 9/1998 |
| JP | 11-248954 | 9/1999 |
| JP | 11-251144 | 9/1999 |

* cited by examiner

*Primary Examiner*—Kevin S. Wood
(74) *Attorney, Agent, or Firm*—Cha & Reiter, LLC

(57) ABSTRACT

An optical hybrid module and method of manufacture includes a plurality of optical devices integrated on an optical waveguide substrate. The structure helps to reduce optical crosstalk among the plurality of optical devices caused by reflections of leakage lights within the optical hybrid module. The optical hybrid module includes a substrate, an optical waveguide formed on the substrate for performing transmission of optical signals, a plurality of optical devices mounted on the substrate to be optically coupled with the optical waveguide, and a light blocking layer formed to have an inclined profile at opposite sides of an end surface of an optical coupling portion centrally provided in the optical waveguide. The light blocking layer serves to prevent light from entering the optical devices, through regions other than the optical waveguide.

14 Claims, 5 Drawing Sheets

OPTICAL HYBRID MODULE AND MANUFACTURING METHOD THEREOF

CLAIM OF PRIORITY

This application claims priority to an application entitled "OPTICAL HYBRID MODULE AND MANUFACTURING METHOD THEREOF," filed in the Korean Intellectual Property Office on Jun. 9, 2003 and assigned Serial No. 2003-36716, the contents of which are hereby incorporated by reference.

BACKGROUND OF THE INVENTION

1. Field of the Invention

The present invention relates to an optical hybrid module comprising a plurality of optical devices integrated on an optical waveguide substrate. More particularly, the present invention relates to an optical hybrid module and a manufacturing method thereof for reducing optical crosstalk between a plurality of optical devices caused by reflections and leakage of light within the optical hybrid module.

2. Description of the Related Art

There has been an increased need for bi-directional optical transmission and reception systems in the recent past. As a result, there also has been an increase in the needs for optical transmitter/receiver modules. The manufacture of such an optical transmitter/receiver module normally requires a plurality of optical devices, such as an optical source, a photodetector and an optical waveguide. Although optical modules can be manufactured by independent assembly of the plurality of optical devices, respectively, it is less competitive in the view of cost and size of products. Therefore, it is preferable to construct an integrated type optical transmitter/receiver module.

With regard to techniques for achieving the integration of the optical module, a great deal of use has been conducted with a hybrid integrated optical module. This type of module is one in which an active device, such as an optical transmitter/receiver, and a passive device, such as a wavelength division multiplexer, constitute hybrid integrated devices on an optical waveguide substrate.

FIG. 1 is a view illustrating one exemplary construction of an optical hybrid module of the prior art. This prior art optical hybrid module comprises a multi-layer thin film filter 11 vertically inserted in a substrate 12. The multi-layer thin film filter 11 serves to separate two lights having different wavelengths, wherein the lights enter through optical fiber 13 and are emitted from optical source 14.

Referring to FIG. 1, certain optical signals having a specific wavelength $\lambda 1$ enter through the optical fiber 13, and these optical signals reach the multi-layer thin film filter 11 located at the opposite side to the optical fiber 13 by being guided through a first optical waveguide formed at the substrate 12. The multi-layer thin film filter 11 is adapted to reflect only a specific wavelength $\lambda 2$. If the wavelength $\lambda 1$ of the light entering through the optical fiber 13 is different from that of the reflection wavelength $\lambda 2$, the light with a wavelength $\lambda 1$ is transmitted through the multi-layer thin film filter 11, so as to reach photodetector 15, (such as a photodiode).

On the other hand, the light emitted from an optical source, such as a laser diode, which light has the wavelength $\lambda 2$ difference from the light that already entered through the optical fiber 13, enters a second optical waveguide and is guided there through. The guided light, however, is reflected by the multi-layer thin film filter 11 because the wavelength $\lambda 2$ is the reflection wavelength of the filter 11, thereby exiting to the outside through the optical fiber 13.

The prior art optical hybrid module described above has a disadvantage in that light produced from a light emitting device is leaked or reflected, thereby ineffectively transmitting to a light receiving device. This inefficiency causes crosstalk of optical signals.

FIG. 2 illustrates another exemplary construction of a prior art optical hybrid module, which was created with the goal of eliminating the above disadvantage of crosstalk. In accordance with the illustrated construction, the optical module is of a type wherein an optical waveguide core portion 22 and cladding portion 23 are formed on a substrate 21, and a light emitting device and a light receiving device 26 are disposed thereon. FIG. 2 also enlarged the view regarding where the light receiving device 26 is mounted. In FIG. 2, reference numeral 24 indicates a portion provided with electrical wiring and a solder layer for mounting the light receiving device 26, and other hatched portions are those on which a light blocking layer 25 is formed. The light blocking layer 25 is made of a metal film. As the light blocking layer 25 is provided around the light emitting device and light receiving device 26, it is possible to prevent light from entering the light receiving device 26 from lower and lateral portions of the light receiving device 26.

The optical module of the prior art shown in FIG. 2 has a vertical surface at a region where it is optically coupled with the light receiving device, that is, at a region including the optical waveguide core portion. But, it is actually very difficult to form the light blocking layer at such a vertical surface. Thus, the optical module as shown in FIG. 2 above is a hypothetical structure that, when considered from a manufacturing viewpoint, is virtually impossible to realize.

SUMMARY OF THE INVENTION

Therefore, the present invention has been made at least with regard to overcoming one or more of the above-mentioned problems of the prior art. It is also an object of the present invention to provide an optical hybrid module and a manufacturing method thereof that enables mass production of optical hybrid modules that minimizes crosstalk of optical signals resulting from leakage of light. The leakage is primarily from an optical source entering a light receiving device during optical coupling between an optical semiconductor device and an optical waveguide.

In accordance with a first aspect of the present invention, the above and other objects can be accomplished by the provision of an optical hybrid module comprising: a substrate; an optical waveguide formed on the substrate for performing transmission of optical signals; a plurality of optical devices mounted on the substrate to be optically coupled with the optical waveguide; and a light blocking layer formed to have an inclined profile at opposite sides of an end surface of an optical coupling portion centrally provided in the optical waveguide, thereby serving to prevent light from entering the optical devices, through regions other than the optical waveguide.

It is preferable that the end surface of the optical coupling portion centrally provided in the optical waveguide may be formed to have a groove relative to the light blocking layer, or it can protrude relative to the light blocking layer.

It is also preferable that the light blocking layer may be formed over a surface of the optical waveguide, except for the optical coupling portion, and over a whole surface of the substrate.

In accordance with another aspect of the present invention, there is provided a method of manufacturing an optical hybrid module comprising the steps of: (a) forming an optical waveguide on a substrate: (b) patterning a hard etching mask for forming a vertical end surface on a region of the optical waveguide including an optical coupling portion; (c) patterning inclined masks for forming inclined end surfaces on regions not formed with the hard etching mask at opposite sides of the region including the optical coupling portion; (d) etching the optical waveguide under the hard etching mask and inclined masks; and (e) forming a light blocking layer on the inclined end surfaces of the optical waveguide, except for the vertical end surface of the region including at least the optical coupling portion, and on the substrate.

With regard to the above-recited method, step (c) may be performed by a grayscale lithography process.

In addition, it is also preferable that the light blocking layer be formed over a whole surface of the optical waveguide, except for the optical coupling portion, and over a whole surface of the substrate.

BRIEF DESCRIPTION OF THE DRAWINGS

The above and other objects, features and other advantages of the present invention will be more clearly understood from the following detailed description taken in conjunction with the accompanying drawings, in which:

FIG. 7b is a side view illustrating the movement path of reflected light in the optical hybrid module shown in FIG. 7a.

DETAILED DESCRIPTION OF THE PREFERRED EMBODIMENTS

Figure 1:
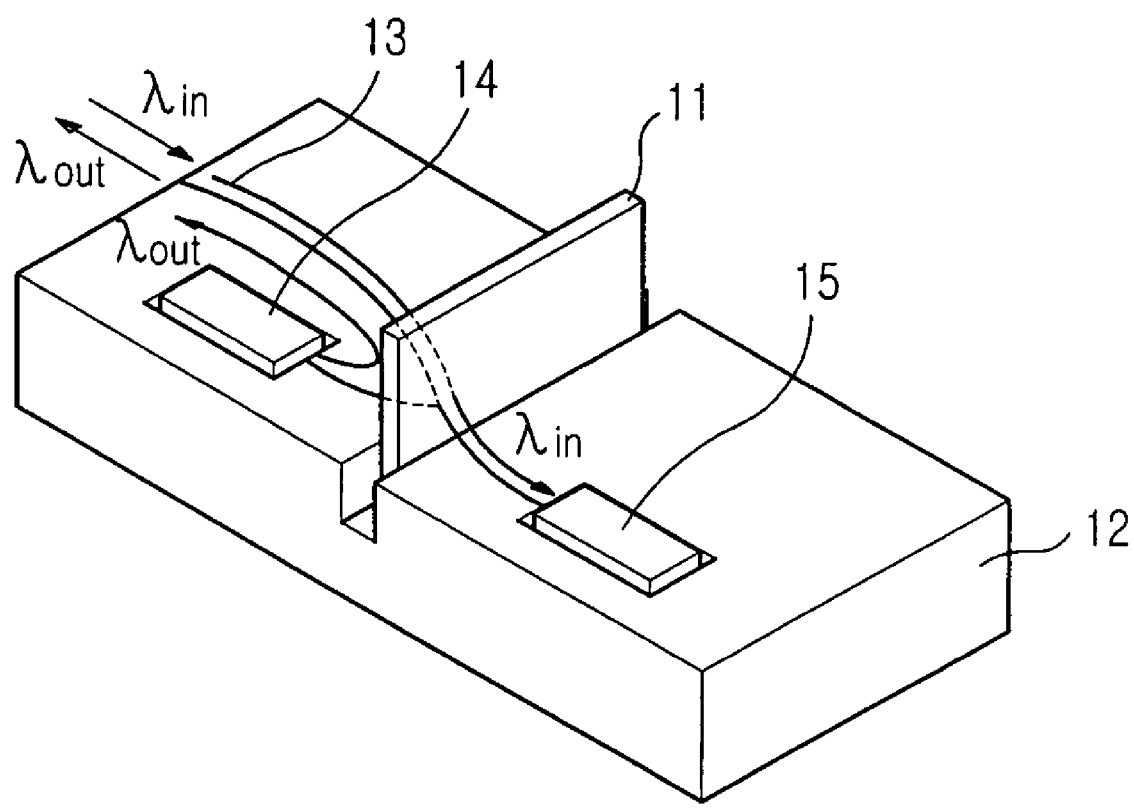
FIG. 1 is a view illustrating one exemplary construction of an embodiment of an optical hybrid module of the prior art.
Figure 2:
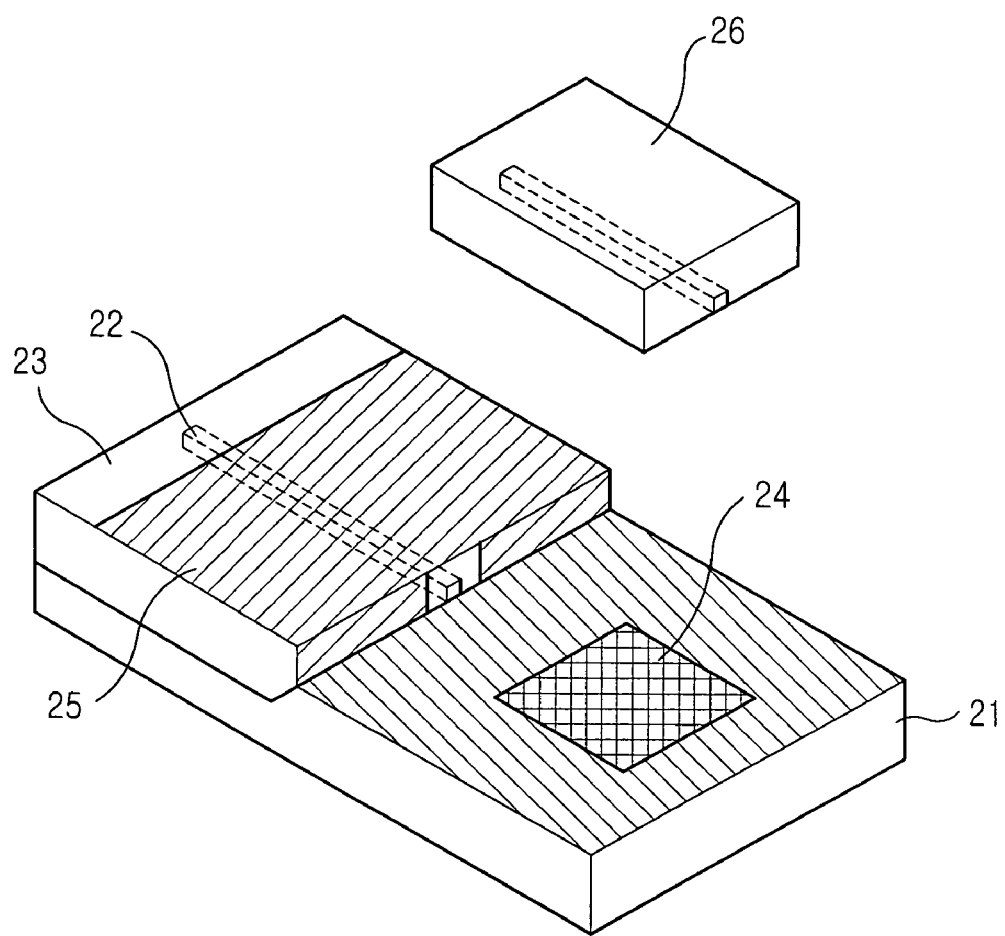
FIG. 2 is a view illustrating another exemplary construction of yet another embodiment of an optical hybrid module of the prior art.

Preferred aspects of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may serve to obscure the subject matter of the present invention rather than clarify. Also, the terms used in the following description are terms defined taking into consideration the functions obtained in accordance with the present invention. The definitions of these terms should be determined based on the whole content of this specification because it may be changed in accordance with the desire of a user or chip designer or a usual practice.

Figure 3:
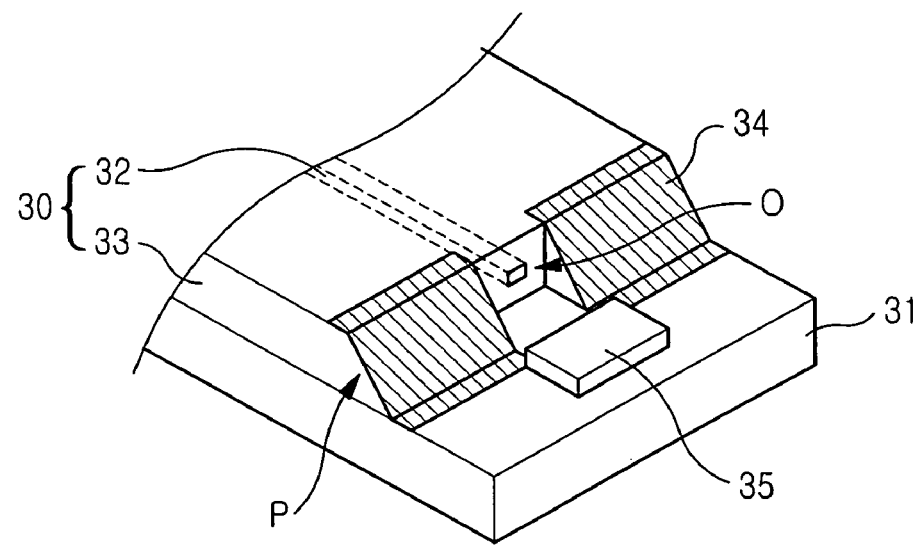
FIG. 3 is a view illustrating the construction of an optical hybrid module according to one embodiment of the present invention.

FIG. 3 is a view illustrating the construction of an optical hybrid module according to a first aspect of the present invention. For the purpose of explaining an implementation principle of the present invention, FIG. 3 illustrates only a portion of the optical hybrid module, including an end surface of an optical coupling portion centrally provided in an optical waveguide.

Referring to FIG. 3, the optical hybrid module of the present invention comprises a substrate 31, and an optical waveguide 30 arranged over at least a portion of the substrate, a light blocking layer 34 and a light receiving device 35 subsequently mounted on the substrate 31.

Figure 4:
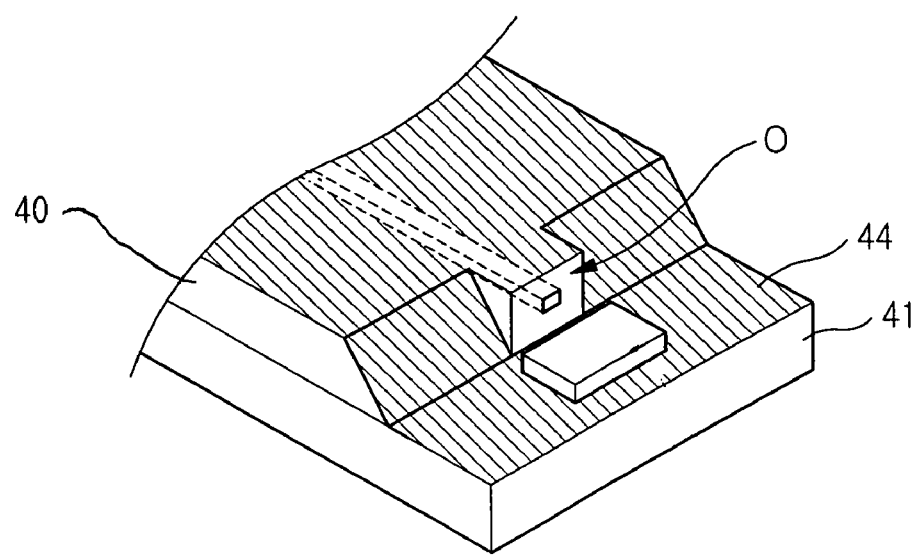
FIG. 4 is a view illustrating the construction of an optical hybrid module according to another embodiment of the present invention.

As also shown in FIG. 3, the optical waveguide 30 comprises a core portion 32 for performing transmission of optical signals, and a cladding portion 33 surrounding the core portion 32. The optical waveguide 30 further includes an optical coupling portion O to be optically coupled with the light receiving device 35, which may be a device such as a photodiode (PD). The optical waveguide 30 also has an end surface having a structure perpendicular to the substrate 31 at a region including the optical coupling portion O, while having end surfaces P having a structure inclined relative to the substrate 31 at an end region except for the region including the optical coupling portion O. As the end surfaces P of the optical waveguide 30 have an inclination, the central region including the optical coupling portion may have an end surface than is recessed relative to the position inclined surfaces of the light blocking layer 34, as shown in FIG. 3, or a protruding end portion relative to the position of the inclined surfaces 34, as shown in FIG. 4. Due to the inclination of the surfaces of the light blocking layer, a subsequent process of forming the light blocking layer 34 on the end surfaces P can be easily constructed.

The light blocking layer 34, which is formed on the inclined end surfaces P of the optical waveguide 30 at opposite sides of the region including the optical coupling portion O, serves to prevent undesirable light from entering the light receiving device 35, such as a photodetector, through lower and lateral portions of the light receiving device 35. The light blocking layer 34 may be made of a metal film or mirror material, and the like. Where the light blocking layer 34 is formed at the opposite sides of the region including at least the optical coupling portion O as shown in FIG. 3, the optical coupling portion O of the optical waveguide 30 is recessed to have a groove relative to the light blocking layer 34.

FIG. 4 is a view illustrating the construction of an optical hybrid module according to yet another aspect of the present invention. Since this embodiment is similar in construction and operation to the embodiment shown in FIG. 3, only the differences will be explained in order to avoid the repetition of description.

Differences between two aspects shown in FIGS. 3 and 4 are in that a light blocking layer 44 is arranged so as to cover the whole upper surface of an optical waveguide 40 and the whole upper surface of a substrate 41, in addition to an inclined end surface of the optical waveguide 40, and in that an optical coupling portion O of the optical waveguide 40 is protruded from the light blocking layer 44.

Figure 5:
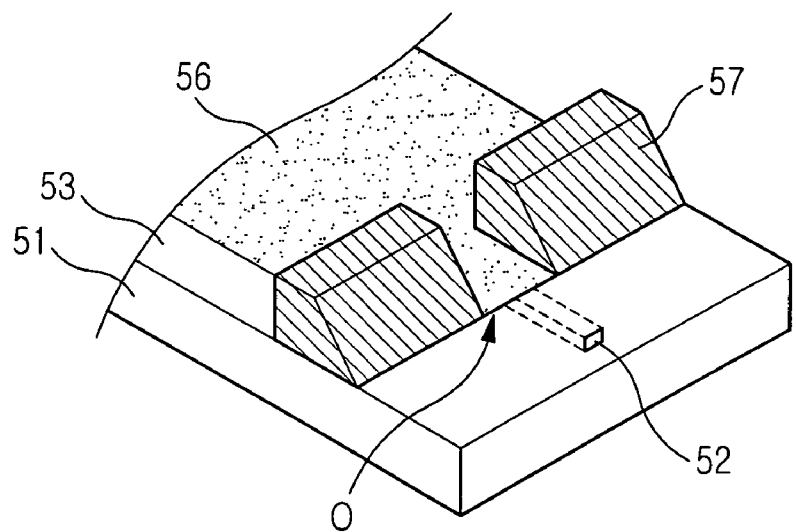
FIG. 5 is a view illustrating positions of masks in the manufacture of the optical hybrid module shown in FIG. 4.
Figure 6:
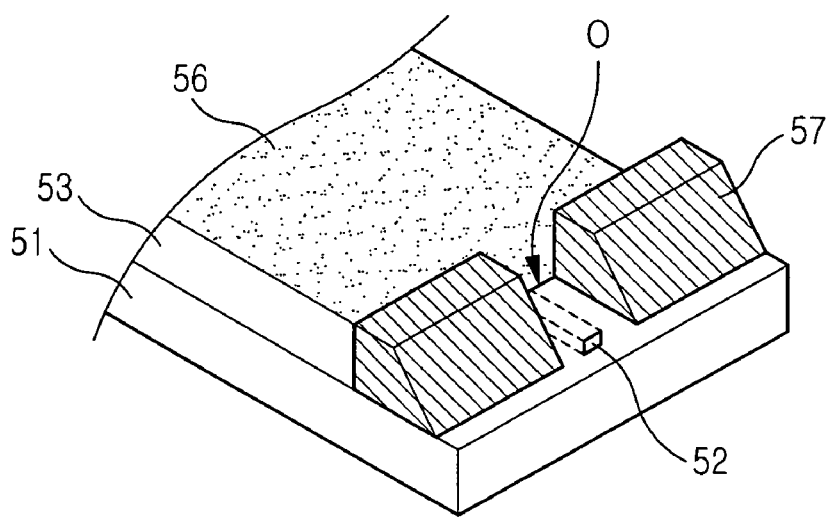
FIG. 6 is a view illustrating positions of masks in the manufacture of the optical hybrid module shown in FIG. 3.

FIG. 5 illustrates a sub-step of a masking process that may be used in the manufacture of the optical hybrid module shown in FIG. 4. Now, a manufacturing procedure of the optical hybrid module is explained in conjunction with FIG. 5.

Referring to FIG. 5, after a core portion 52 and cladding portion 53 of an optical waveguide are formed on a silicon substrate 51, a hard etching mask 56 is patterned on a region requiring a vertical end surface, that is, on a region including an optical coupling portion O of the optical waveguide. Subsequent to the patterning, the inclined photoresist (PR) masks 57 are patterned on a region requiring an inclined end surface, that is, at the opposite sides of the region including the optical coupling portion O, using a grayscale lithography process.

The determination of how the optical coupling portion O will be coupled to a light blocking layer in a subsequent process of forming the light blocking layer is made according to the position of the inclined photoresist masks 57. In other words, in a case that final positions of the hard etching mask 56 and inclined photoresist masks 57 are the same as each other as shown in FIG. 5, the optical coupling portion O has a protruded structure as shown in FIG. 4. However, in a case where the inclined photoresist masks 57 are positioned in front of the hard etching mask 56, the optical coupling portion O has a recessed structure as shown in FIG. 3.

Next, through a dry etching process using the hard etching mask 56 and inclined photoresist masks 57, a portion under the hard etching mask 56 forms a vertical end surface, and portions under the inclined photoresist masks 57 form inclined end surfaces. In this case, since the end surface of the optical waveguide is variable according to the shape of the inclined photoresist mask and the degree of light exposure, it should be appropriately adjusted to achieve an inclined profile of the optical waveguide having a negative inclination.

After the etching process has completed, the light blocking layer is formed by performing deposition of a metal film on the inclined end surfaces of the optical waveguide. Preferably, the light blocking layer extends onto a portion of the substrate on which a light receiving device is disposed, in addition to the inclined end surfaces of the optical waveguide. In addition, the light blocking layer may be formed over the whole surface of the optical waveguide and the whole surface of the substrate.

Figure 7A:
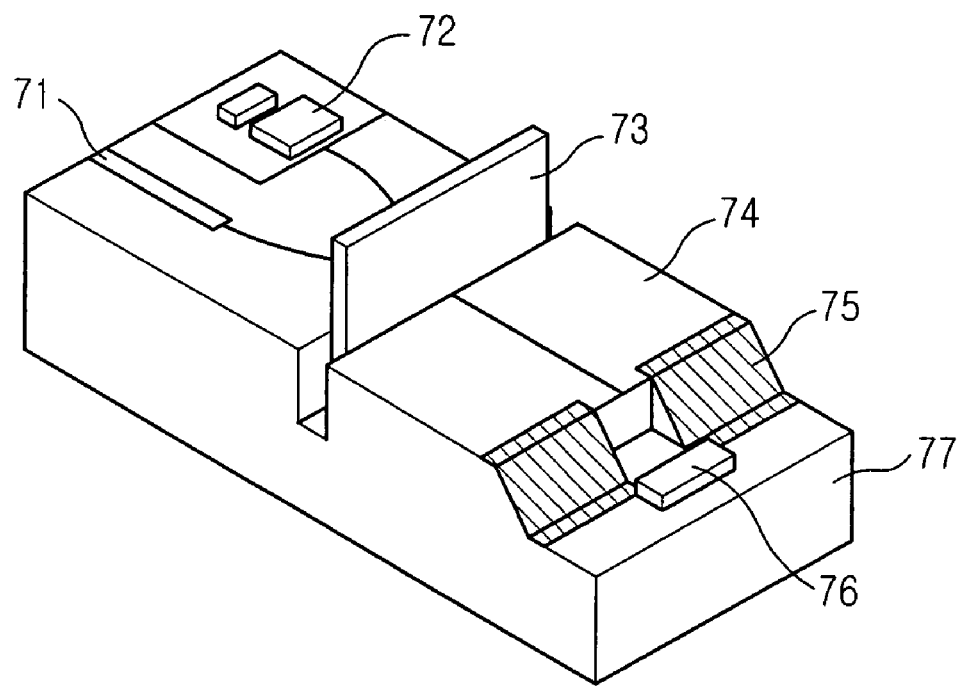
FIG. 7a is a perspective view illustrating the construction of an optical hybrid module of the present invention.
Figure 7B:
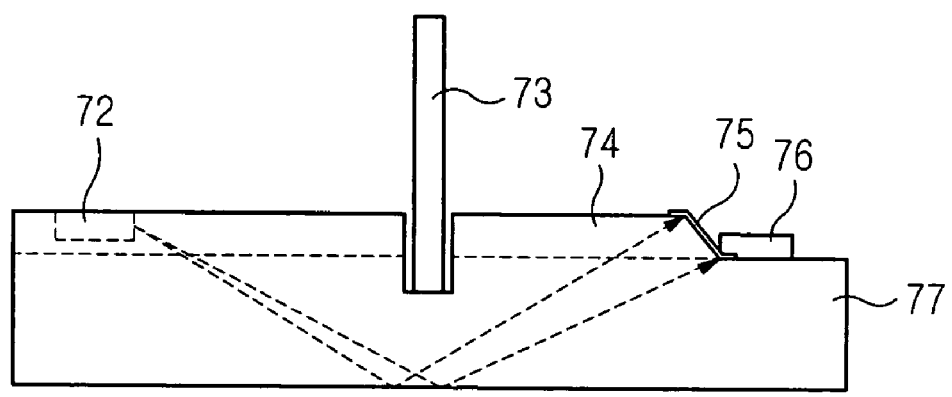

FIG. 7a illustrates an application of the present invention. More particularly, FIG. 7a is a perspective view illustrating the construction of an optical hybrid module of the present invention. FIG. 7b is a side view illustrating the movement path of reflected light in the optical hybrid module shown in FIG. 7a.

The optical hybrid module that is shown in FIG. 7a comprises a multi-layer thin film filter, which separates two lights, entering through an optical fiber 71 and emitted from an optical source 72, according to the difference of wavelengths there between. As shown in FIG. 7b, the optical hybrid module comprises a light blocking layer 75 formed on an end surface of an optical waveguide 74 at opposite sides of an optical coupling portion O. The light blocking layer 75 has an inclined profile with a negative inclination.

Now, the operation of the optical hybrid module is simply described in relation to the movement path of optical signals.

Referring to FIG. 7a, optical signals having a specific wavelength are permitted to enter through the optical fiber 71, and are guided through the optical waveguide 74, thereby reaching the multi-layer thin film filter 73 located at the opposite side to the optical fiber 71. The multi-layer thin film filter 73 is adapted to reflect only a predetermined wavelength.

Therefore, if the wavelength of light entered through the optical fiber 71 is different from the predetermined reflection wavelength of the multi-layer thin film filter 73, the light is transmitted through the multi-layer thin film filter 73, thereby reaching a photo detector 76.

On the other hand, there can also be light that is emitted from the light source 72, such as a laser diode, and having a different wavelength from the light entering through the optical fiber 71, enters the optical waveguide 74 and is guided there through. Then, the guided light is reflected by the multi-layer thin film filter 73, thereby exiting to the outside through the optical fiber 71. In this case, as shown in FIG. 7b, the light, transmitted downward in a substrate 77 and then reflected at the bottom surface of the substrate 77, cannot enter the photo detector 76 because it is shielded by the light blocking layer 75.

It should be noted that the light source 72 has a separate path from the optical fiber 71, such that the light from the optical fiber and from the separate light source enter the waveguide from separate paths. However, the light enters the optical fiber from a first path and exits the separate light source from a second path both travel through the waveguide and are incident upon the a multi-layer thin film filter 73.

Although the preferred aspects and mode of the present invention have been disclosed for illustrative purposes, those skilled in the art will appreciate that various modifications, additions and substitutions are possible, without departing from the scope and spirit of the invention as disclosed in the accompanying claims. For example, in addition to a dielectric multi-layer thin film filter as stated above, a multi-mode interferometer (MMI) or directional coupler may be added. This is just one example of the modifications that can be made by the artisan.

As apparent from the above description, an optical hybrid module according to the present invention comprises a light blocking layer formed on an optical waveguide at opposite sides of an optical coupling portion. The light blocking layer is formed to have an inclined profile with a negative inclination. Therefore, the optical hybrid module can achieve mass production thereof while minimizing crosstalk of optical signals.

What is claimed is:

1. An optical hybrid module comprising:
    a substrate;
    an optical waveguide having an optical coupling portion that is formed on at least a portion of the substrate to perform a transmission of optical signals, and an inclined surface that is disposed on a lateral side of the coupling portion and inclined with respect to an end surface of the optical coupling portion, said waveguide being adapted for connection with a plurality of optical devices; and
    a light blocking layer formed on whole upper surface of the optical waveguide and formed over the inclined surface of the optical waveguide, said light blocking layer preventing light from entering the optical devices, coupled to the optical waveguide, through regions other than the optical waveguide.

2. The optical hybrid module as set forth in claim 1, further comprising a plurality of optical devices mounted on the substrate that are optically coupled with the optical waveguide.

3. The optical hybrid module as set forth in claim 1, wherein the plurality of optical devices mounted on the substrate includes a light receiving device optically coupled with the waveguide.

4. The optical hybrid module as set forth in claim 3, wherein the plurality of optical devices mounted on the substrate includes:
   a multi-layer thin film filter arranged at least partly within and substantially perpendicular to the optical waveguide so as to reflect light of a predetermined wavelength transmitted through the optical waveguide, and permit passage of light having a different wavelength from the predetermined wavelength, and
   an optical fiber; and
   a separate light source, such that the light from the optical fiber and from the separate light source enter the waveguide from separate paths; and
   wherein light entering the optical fiber from a first path and exiting the separate light source from a second path travel through the waveguide and are incident upon the a multi-layer thin film filter.

5. The optical hybrid module as set forth in claim 1, wherein the plurality of optical devices are integrally formed on the substrate module.

6. The optical hybrid module as set forth in claim 1, wherein an end surface of the optical coupling portion centrally provided in the optical waveguide is recessed relative to the light blocking layer by having a groove.

7. The optical hybrid module as set forth in claim 1, wherein an end surface of the optical coupling portion centrally provided in the optical waveguide is protruded relative to the light blocking layer.

8. The optical hybrid module as set forth in claim 1, wherein the waveguide comprises an end surface of the optical coupling portion centrally provided that is formed substantially perpendicular to an upper surface of the substrate.

9. The optical hybrid module as set forth in claim 8, wherein the perpendicular end surface of the optical coupling portion is recessed relative to a position of the inclined surfaces of the light blocking layer.

10. The optical hybrid module as set forth in claim 1, wherein the light blocking layer is formed over a surface of the optical waveguide, except for the optical coupling portion, and over a whole surface of the substrate.

11. The optical hybrid module as set forth in claim 1, wherein the light blocking layer comprises a metal layer.

12. The optical hybrid module as set forth in claim 1, wherein the light blocking layer comprises a mirror material.

13. The optical hybrid module as set forth in claim 1, wherein an end surface of the optical coupling portion centrally provided in the optical waveguide is recessed relative to the inclined surfaces of the light blocking layer.

14. The optical hybrid module as set forth in claim 1, wherein the optical waveguide comprises:
   a core layer; and
   a cladding layer surrounding the core layer.

* * * * *